S. E. JONES.
FERTILIZER DISTRIBUTER.
APPLICATION FILED JULY 9, 1909.
934,317.
Patented Sept. 14, 1909.
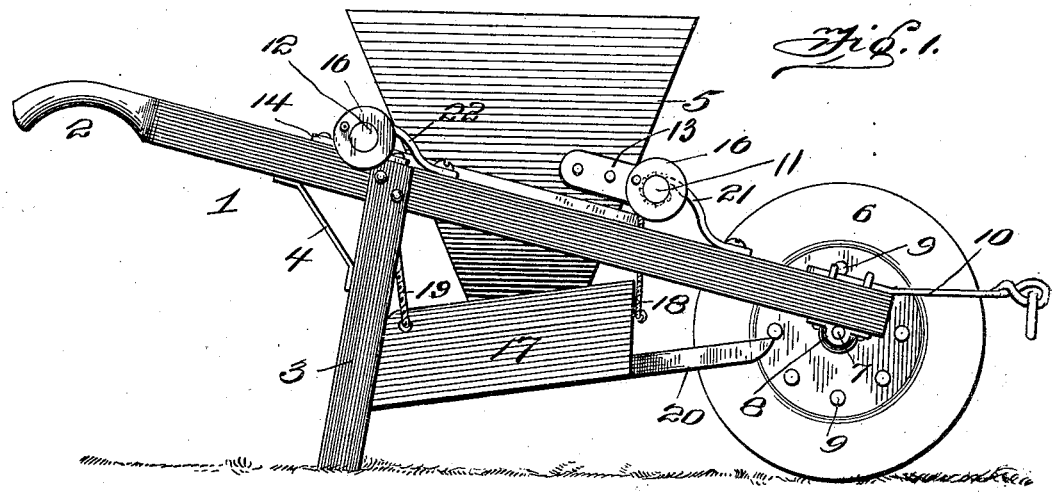
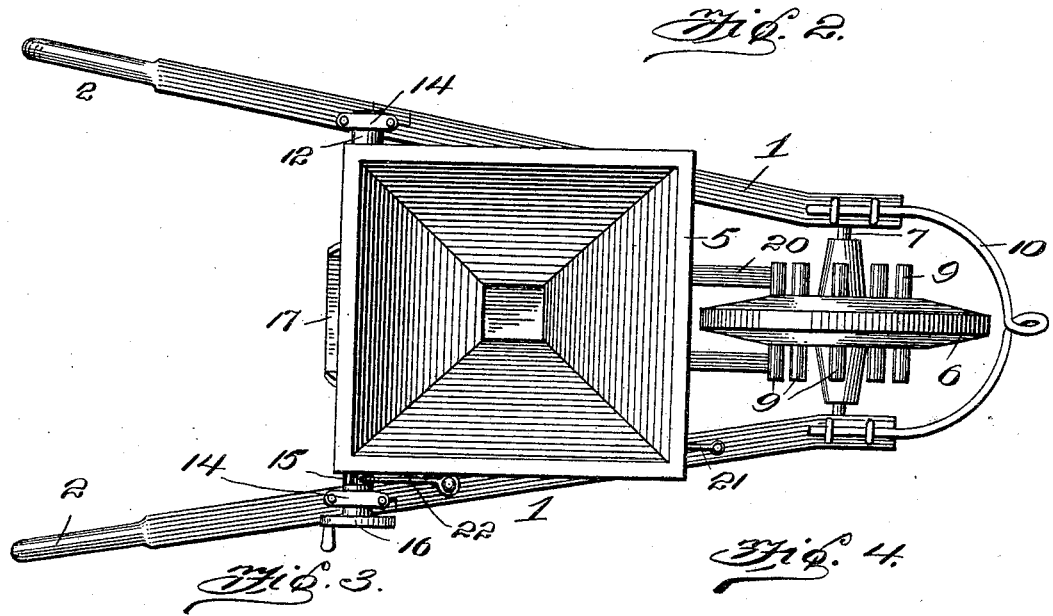
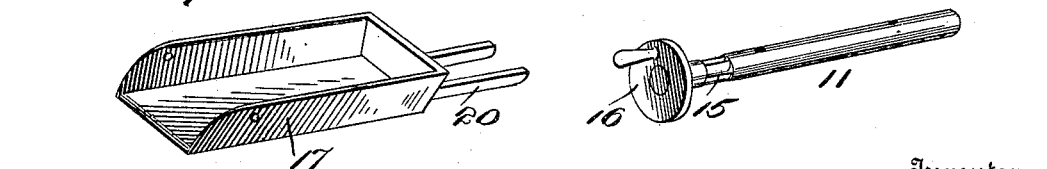
Witnesses
Inventor
Sidney E. Jones.
By Victor J. Evans
Attorney

UNITED STATES PATENT OFFICE.

SIDNEY EUGENE JONES, OF ATMORE, ALABAMA.

FERTILIZER-DISTRIBUTER.

934,317.

Specification of Letters Patent. Patented Sept. 14, 1909.

Application filed July 9, 1909. Serial No. 506,763.

*To all whom it may concern:*

Be it known that I, SIDNEY EUGENE JONES, a citizen of the United States, residing at Atmore, in the county of Escambia and State of Alabama, have invented new and useful Improvements in Fertilizer-Distributers, of which the following is a specification.

This invention is an improved fertilizer distributer, the object of the invention being to provide an improved machine of this class which is cheap, strong, simple and in which the distributing shoe is suspended at its front and rear ends by independently adjustable flexible elements such as cords or the like so that the shoe may be readily adjusted to any required angle according to the quantity of fertilizer to be used and so that the shoe is adapted to yield to the tappets of the knocker wheel both when the machine is moving forwardly and rearwardly, the invention consisting in the construction, combination and arrangement of devices hereinafter described and claimed.

In the accompanying drawings:—Figure 1 is a side elevation of a fertilizer distributer constructed in accordance with my invention. Fig. 2 is a plan of the same. Fig. 3 is a detail perspective of the fertilizer distributing shoe. Fig. 4 is a similar view of one of the adjusting winches.

The frame of the machine comprises side bars 1 having handles 2 at their rear ends and supporting legs 3 attached to and depending from the said bars. Said supporting legs are provided with braces 4. The hopper 5 has its lower portion disposed between the side bars and secured firmly thereto. The usual knocker wheel 6 has its axle 7 mounted in bearings 8 which are on the under sides of the side bars 1 at the front ends thereof. Said knocker wheel has tappet spurs 9 arranged in concentric series and projecting from opposite sides thereof. At the front end of the frame is a draft bail 10 secured to the front ends of the side bars.

Supporting and adjusting winches 11, 12, are respectively mounted immediately in front and behind the hopper, their bearings being indicated at 13, 14, respectively. Each of the said winches is provided near one end with a ratchet portion 15 and with a crank wheel 16. The shoe 17 is hung below the hopper by means of cords or other flexible connections 18, 19, the said cords being respectively connected to the winches 11, 12, and to the front and rear portions of the shoe. The shoe is provided at its front end with forwardly extending tappet arms 20 which are disposed on opposite sides of the knocker wheel and in the path of the tappet studs 9 so that when the wheel revolves by the motion of the machine, its tappet studs successively raise and drop the front end of the shoe and hence agitate the shoe to such an extent as to cause it to discharge the fertilizer supplied thereto from the hopper. It is obvious that by appropriately turning one or both of the winches in the required direction or directions, the shoe may be raised or lowered at either end and hence set at any desired angle according to the quantity of fertilizer to be distributed by the machine. The cords which suspend the shoe being flexible, either end of the shoe may be raised by the action of the knocker wheel and its tappets according to the direction in which the wheel is turned and as to whether the machine is being moved forwardly or rearwardly. To lock the winches at the required adjustment, I provide spring pawls 21, 22, which respectively engage the ratchet portions of the winches 11, 12, and are secured on one side bar 1 of the machine frame.

What is claimed is:—

1. A fertilizer distributer comprising a frame having a knocker wheel provided with tappets, a hopper carried by the frame, a shoe under the hopper having tappet arms for engagement by the tappet of the knocker wheel, cords suspending the front and rear ends of the shoe under the hopper and means for independently adjusting said cords for the purpose set forth.

2. A fertilizer distributer comprising a frame having a knocker wheel provided with tappets, a hopper mounted on the frame, a shoe under the hopper and having tappet arms for engagement by the tappets of the knocker wheel, winches at the front and rear sides of the hopper, means to turn and means to lock said winches and cords attached to said winches and to the front and raised ends of the shoe respectively, said cords and winches adapting either end of the shoe to be raised or lowered independently of the other.

In testimony whereof I affix my signature in presence of two witnesses.

SIDNEY EUGENE JONES.

Witnesses:
L. B. PURVIS,
B. P. PURVIS.